(12) United States Patent
Ziegler et al.

(10) Patent No.: US 9,431,704 B2
(45) Date of Patent: Aug. 30, 2016

(54) ANTENNA APPARATUS AND METHOD FOR ELECTRONICALLY PIVOTING A RADAR BEAM

(71) Applicant: EADS Deutschland GmbH, Ottobrunn (DE)

(72) Inventors: Volker Ziegler, Hohenbrunn (DE); Benedikt Schulte, Neubiberg (DE)

(73) Assignee: EADS Deutschland GmbH, Ottobrunn (DE)

( * ) Notice: Subject to any disclaimer, the term of this patent is extended or adjusted under 35 U.S.C. 154(b) by 242 days.

(21) Appl. No.: 13/888,909

(22) Filed: May 7, 2013

(65) Prior Publication Data
US 2013/0300603 A1 Nov. 14, 2013

(30) Foreign Application Priority Data
May 8, 2012 (DE) .................. 10 2012 104 037

(51) Int. Cl.
*H01Q 3/34* (2006.01)
*H01Q 1/28* (2006.01)
*H01Q 3/22* (2006.01)
*G01S 7/03* (2006.01)
*G01S 7/06* (2006.01)
(Continued)

(52) U.S. Cl.
CPC . *H01Q 3/34* (2013.01); *G01S 7/03* (2013.01); *G01S 7/062* (2013.01); *G01S 13/426* (2013.01); *G01S 13/94* (2013.01); *H01Q 1/28* (2013.01); *H01Q 3/22* (2013.01); *G01S 2013/0245* (2013.01)

(58) Field of Classification Search
CPC .................. G01S 13/426; G01S 13/94; G01S 2013/0245; G01S 7/03; G01S 7/062; H01Q 1/28; H01Q 3/22; H01Q 3/34

USPC ........................................... 342/372
See application file for complete search history.

(56) References Cited

U.S. PATENT DOCUMENTS 3,438,035 A 4/1969 Fling et al.
3,646,559 A 2/1972 Wiley
(Continued)

FOREIGN PATENT DOCUMENTS

| DE | 103 45 314 A1 | 4/2005 |
| DE | 10 2011 081 677 A1 | 3/2012 |
| WO | 00/51202 A1 | 8/2000 |

OTHER PUBLICATIONS

German Office Action of the corresponding German Patent Application No. 10 2012 104 037.0, dated Jan. 24, 2013.
(Continued)

*Primary Examiner* — Timothy A Brainard
(74) *Attorney, Agent, or Firm* — Global IP Counselors, LLP

(57) ABSTRACT

An antenna apparatus for a radar sensor having a plurality of individual antenna devices that interact through interference to generate and/or receive a radar beam at a predetermined angle of transmission and/or reception. The individual antenna devices are provided with a radar signal and are arranged such that a first angle of transmission and/or reception of the radar beam is determined via an analog beam formation and a second angle of transmission and/or reception of the radar beam is determined via a digital beam formation. The antenna apparatus further includes a feed device configured to generate the radar signal. In addition, the radar beam can be electronically pivoted. Also, an aircraft can include the antenna apparatus.

20 Claims, 5 Drawing Sheets

(51) Int. Cl.
*G01S 13/42* (2006.01)
*G01S 13/94* (2006.01)
*G01S 13/02* (2006.01)

(56) References Cited

U.S. PATENT DOCUMENTS

| | | | | |
|---|---|---|---|---|
| 4,996,532 | A * | 2/1991 | Kirimoto | G01S 7/36 342/17 |
| 5,239,301 | A | 8/1993 | Martin | |
| 5,544,525 | A * | 8/1996 | Peterman | G01P 5/244 73/170.13 |
| 6,184,825 | B1 * | 2/2001 | Wehner | H01Q 3/02 342/358 |
| 2007/0210959 | A1 * | 9/2007 | Herd et al. | 342/368 |
| 2011/0163231 | A1 * | 7/2011 | Salmon | G01V 8/005 250/336.1 |
| 2012/0033761 | A1 | 2/2012 | Guo et al. | |
| 2012/0179043 | A1 * | 7/2012 | Kim | G01S 7/52017 600/447 |
| 2013/0088381 | A1 * | 4/2013 | Puzella | G01S 7/032 342/154 |
| 2013/0202054 | A1 * | 8/2013 | Khan | H01Q 3/26 375/259 |
| 2013/0244593 | A1 * | 9/2013 | Alrabadi | H04B 1/525 455/78 |

OTHER PUBLICATIONS

The extended European Search Report for the corresponding European application No. 13166682.8, issued on May 22, 2014.

* cited by examiner

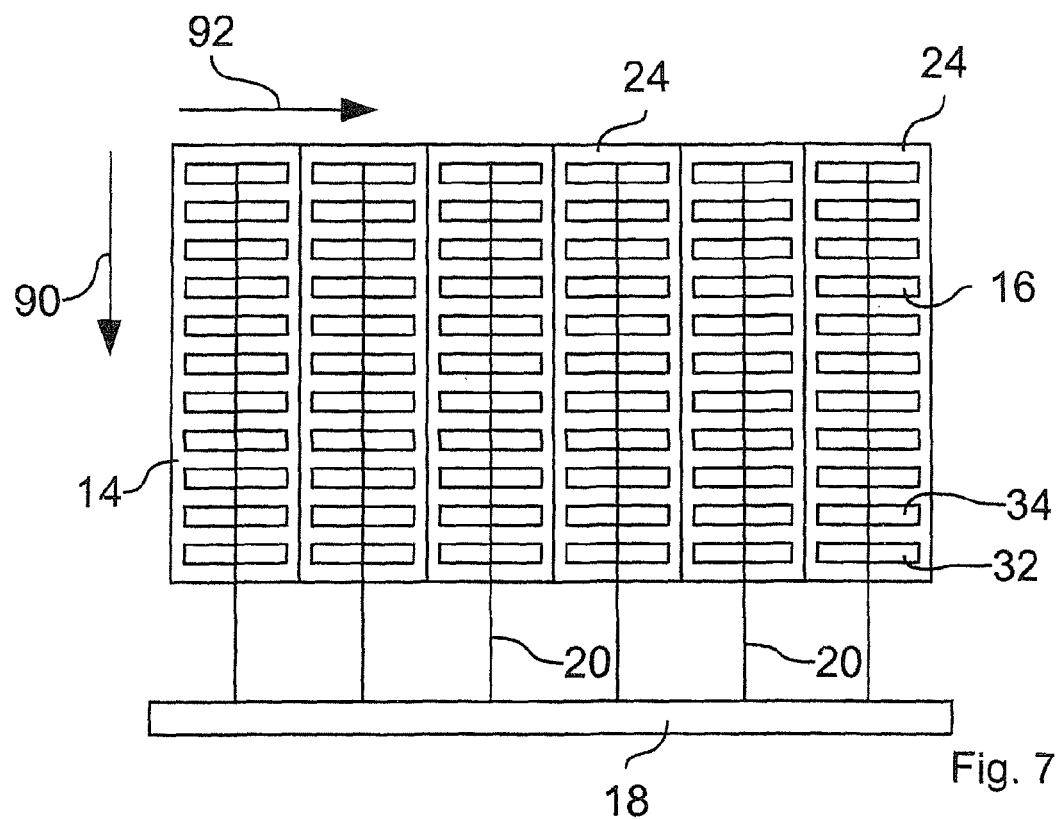
Fig. 7
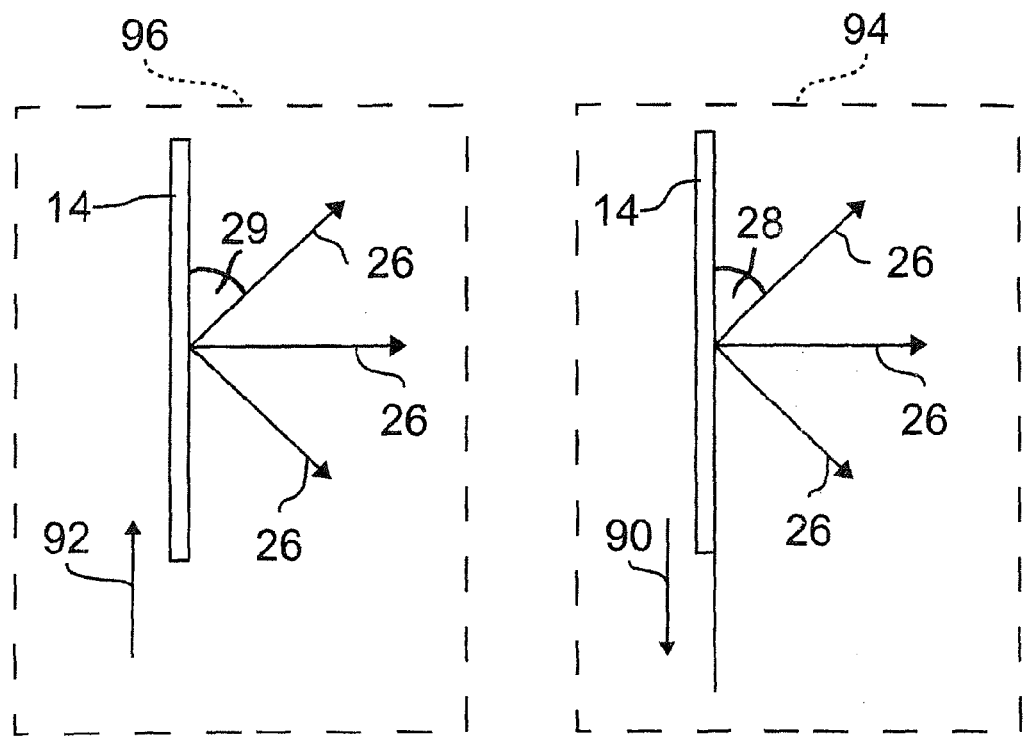
Fig. 8
Fig. 9

ANTENNA APPARATUS AND METHOD FOR ELECTRONICALLY PIVOTING A RADAR BEAM

CROSS-REFERENCE TO RELATED APPLICATIONS

This application claims priority under 35 U.S.C. §119(a) to German Patent Application No. 10 2012 104 037.0, filed in Germany on May 8, 2012, the entire contents of German Patent Application No. 10 2012 104 037.0 are hereby incorporated herein by reference.

BACKGROUND

1. Field of the Invention

The present invention relates to an antenna apparatus for a radar sensor that has a plurality of individual antenna devices that interact through interference to generate/and or receive a radar beam. The individual antenna devices are provided with a radar signal that is generated by a feed device. In addition, the application relates to a method for electronically pivoting a radar beam, wherein the radar beam is generated through interference of radar signals that are emitted by a plurality of individual antennas. Furthermore, the application relates to a radar sensor having such an antenna apparatus with which such a method can be carried out, as well as an aircraft having such a radar sensor.

2. Background Information

Antenna apparatuses of the kind initially specified are used as radar sensors in radar devices to detect surface structures of solid or liquid materials. This application is particularly interesting for use as an obstacle radar in aircraft. Here, the shape of the radiating antennas focuses the high-frequency electromagnetic waves, which are usually referred to as radar waves, by means of interference and by means of beam formation such that their propagation is limited to a relatively small solid angle. In a sense, a radar beam is generated with which objects can be scanned.

Likewise, radar signals received by the antenna apparatuses can be combined in such a way that it is possible to filter the signals whose propagation direction forms a specific angle to the antenna apparatus using phase shifting of the received radar signals. This angle to which the reception is limited is referred to as the reception lobe.

In order to generate a three-dimensional image for detecting obstacles with a radar sensor, the antenna of the sensor can either be moved mechanically in two dimensions, that is, horizontally and vertically, or the radar beam can be pivoted electronically. Known imaging obstacle radars that are, for example, sold by the company Honeywell, have limited image resolution due to the use of low frequencies and are comparatively geometrically large, since the antenna devices that are used particularly have large spatial dimensions due to the wavelengths of the radar waves that are used. Radar systems that use higher frequency ranges to achieve a higher image resolution (for example, Sandblaster from Rockwell Collins) have mechanically pivoted antennas that also require a large amount of space.

SUMMARY

It is therefore an object of the invention to create a radar sensor having improved usability in aircraft.

The antenna apparatus according to the disclosed embodiments has the advantage that the analog beam formation can be easily carried out using known feed devices for radar antennas. The possibility of pivoting a radar beam in a first direction via analog beam formation and in a second direction via digital beam formation allows dispensing with complex mechanical devices for pivoting the entire radar sensor. It is possible to implement suitable feed devices having small space requirements and low weight in comparison to mechanical pivoting. In addition, such an antenna apparatus also allows the use of higher frequencies for the generated radar beam.

The angle of transmission and/or reception can be determined via a frequency of the radar signal. It is possible for feed devices for radar antennas to change the frequency of the radar signal that they provide quickly and precisely. This makes it possible to change the angle of transmission and/or reception efficiently using comparatively easily constructed and known feed devices.

The feed device can be connected to the individual antennas via feed lines, wherein the feed lines to the individual antennas have different lengths. In high-frequency radar signals as generated by the feed device, a propagation time of the radar signals in the feed line influences a phase position of the radar signals at the end of the feed line, that is, at the individual antennas. Using feed lines of different lengths thus provides a simple option for generating a phase shift between different radar signals.

The individual antenna devices can be grouped as antenna groups. A plurality of antenna groups can be arranged next to each other. This particularly makes it possible to create a field of individual antenna devices that are arranged in a rectangular grid. In such a rectangular grid, it is especially easy to specify the effect of phase shifts on the direction of the generated radar beam.

An individual feed line can be provided for each antenna group for connecting to the feed device, the feed device being configured to provide a separate feed signal for each antenna group. The feed device for supplying the antenna groups can be configured in such a way that a phase shift between the radar signals of the individual antenna groups is adjustable.

The feed device can be advantageously configured for analog beam formation in the first pivot plane and for digital beam formation in a second pivot plane. This makes it possible to pivot the radar beam in a wide angular range without having to move the antenna apparatus.

In addition, the method according to the disclosed embodiments can comprise a plurality of antenna groups, which respectively have a plurality of individual antenna devices, being supplied with a feed signal that, depending on the antenna group, has a phase shift relative to the feed signals of the other antenna groups such that the radar beam is pivoted in a second pivot plane. A digital beam formation can be used for this purpose. This makes it possible to pivot the radar beam in a wide angular range without having to move the antenna apparatus.

The previously described antenna apparatus and the previously described method are particularly useful for advantageously constructing a radar sensor. Therefore, one aspect of the invention also relates to a radar sensor having an antenna device according to the invention with which the method according to the invention can be carried out. Such a radar sensor is particularly suitable for use in an aircraft; therefore, one aspect of the invention also relates to an aircraft having such a radar sensor. These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Thus, the invention is described in detail below in relation to the included figures, in which an embodiment of the invention is depicted schematically. Referring now to the attached drawings which form a part of this original disclosure:

FIG. 7 is a schematic front view of an antenna module;

FIG. 8 is a schematic top view of an antenna module;

FIG. 9 is a schematic side view of an antenna module; and

DETAILED DESCRIPTION OF EMBODIMENTS

Selected embodiments will now be explained with reference to the drawings. It will be apparent to those skilled in the art from this disclosure that the following descriptions of the disclosed embodiments are provided for illustration only and not for the purpose of limiting the invention as defined by the appended claims and their equivalents.

Figure 1:
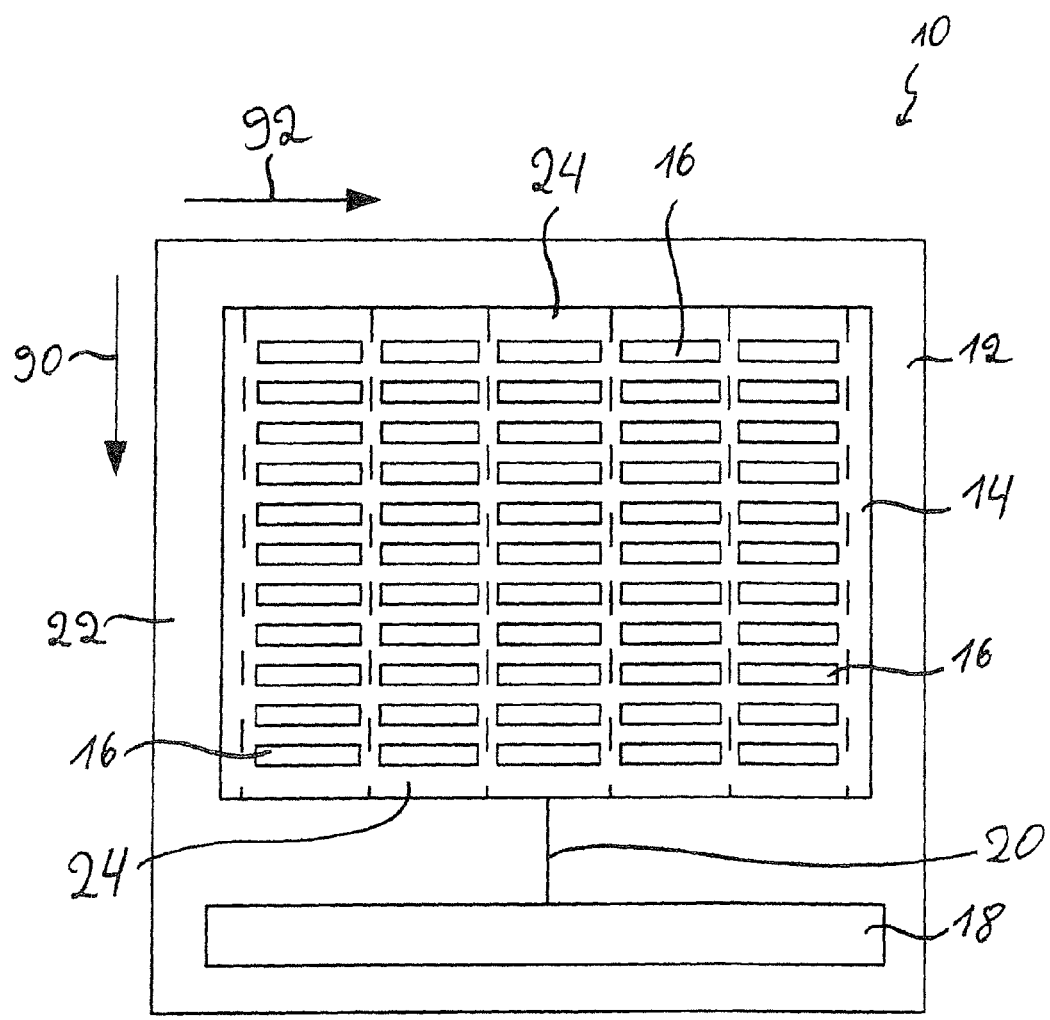
FIG. 1 illustrates a front view of an antenna apparatus.

As shown in FIG. 1, an antenna apparatus 10 for a radar sensor has a frame 12 to which an antenna module 14 is attached. The antenna module 14 is adapted for radiating electromagnetic waves, in particular, high-frequency radar signals. In the present embodiment, the antenna module 14 is particularly useful for radiating electromagnetic waves having a frequency between 76 GHz and 81 GHz.

The antenna module 14 has a plurality of individual antenna devices 16 that are arranged in a flat grid. The grid is rectangular, a first dimension 90 and a second dimension 92 of the grid being perpendicular to each other. The individual antenna devices 16 are respectively arranged along the dimensions 90, 92 in rows. In addition, the individual antenna devices 16 are essentially arranged in an antenna plane 22 in which the dimensions 90, 92 lie. Individual antenna devices 16, which lie along the dimension 90 in a row along a straight line, are respectively combined into an antenna group 24.

A feed device 18 that is connected to the antenna module 14 via feed lines 20 is provided to supply the individual antenna devices 16 with a radar signal that is to be radiated by them. The antenna module 14 has a distribution network, which is not shown, with which the radar signals are distributed to the individual antenna devices 16.

Figure 2:
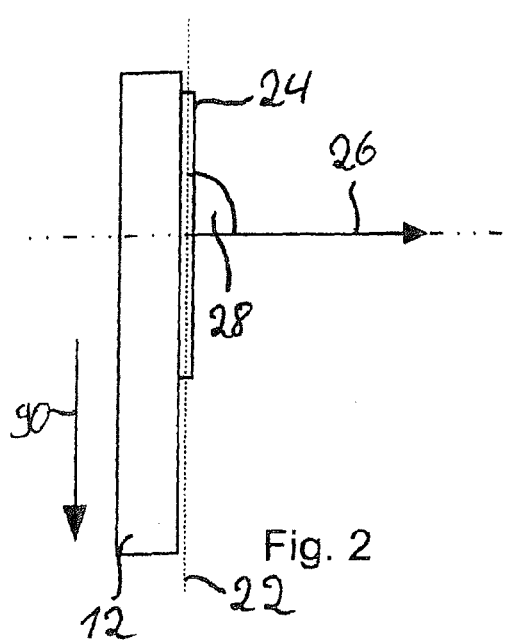
FIG. 2 illustrates a side view of an antenna group of the antenna apparatus.

FIG. 2 shows a side view of one of the antenna groups 24. The radar signal that is supplied to the individual antenna devices 16 of the antenna group 24 has a respective phase position when it arrives at the individual antenna devices 16. Interference of the electromagnetic waves radiated by the individual antenna devices 16 creates a focusing effect that macroscopically produces a radar beam 26 that is radiated at an angle of transmission and/or reception 28 to the antenna plane 22. If the phase position is identical for all radar signals that are supplied to the individual antenna devices 16, the angle 28 is 90°.

Figure 3:
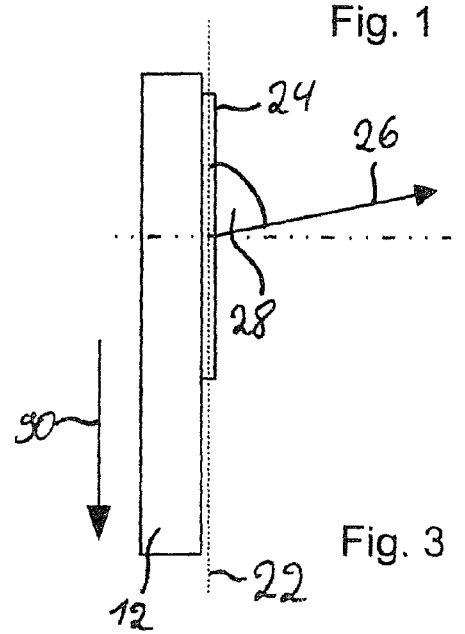
FIG. 3 illustrates a side view of an antenna group of the antenna apparatus.

FIG. 3 shows the radar beam 26 that results if the phase position of the individual antenna devices 16 is varied. In this case, the angle 28 is less than 90°. By appropriately changing the phase position, it is possible to pivot the radar beam 26 in an extremely wide range. The angle 28 can be between 0° and 180°. In an individual antenna group 24 as shown in FIGS. 2 and 3, it is possible to pivot the radar beam 26 only in one plane by interference.

Figure 4:
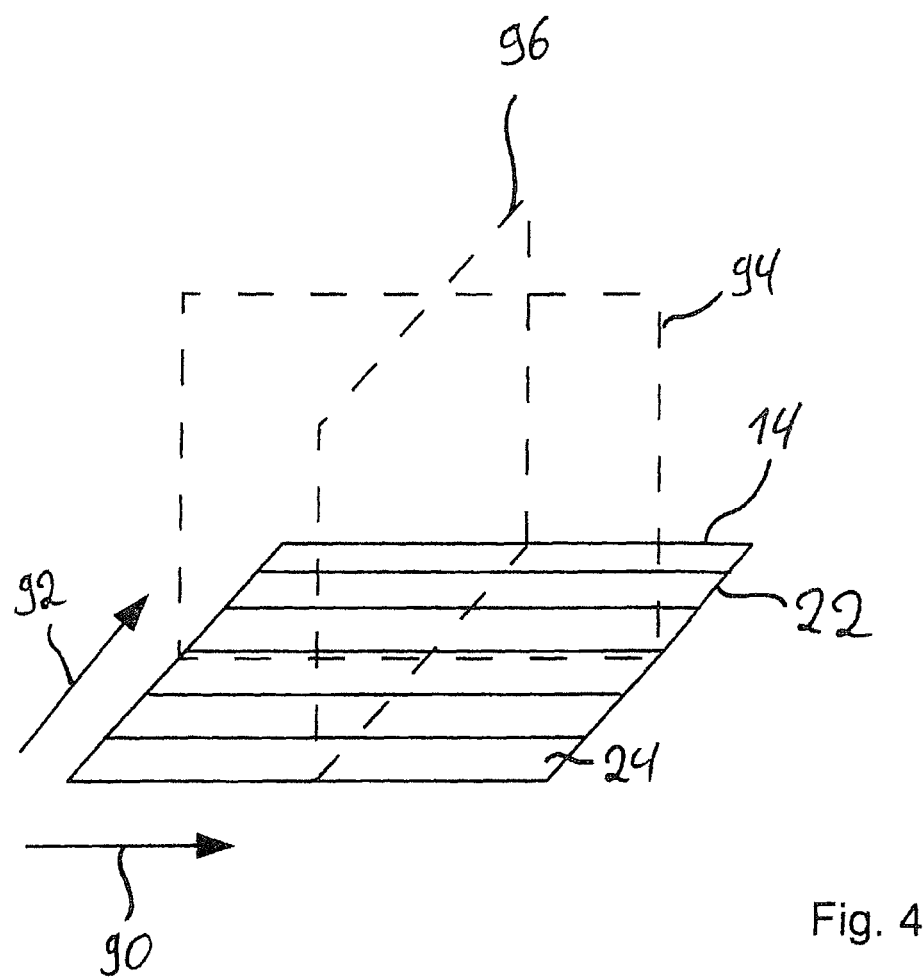
FIG. 4 shows a three-dimensional view of the antenna apparatus.

In FIG. 4, a plurality of antenna groups 24 in the second dimension 92 are arranged adjacent to each other and form an antenna module 14. By changing the phase position of the individual antenna devices 16 within an antenna group 24, it is possible to pivot the radar beam 26 in a first pivot plane 94, which corresponds to changing the first angle 28. If the phase positions of the antenna groups 24 are changed relative to each other, it is in turn possible to pivot the radar beam 26 in a second pivot plane 96 through interference, which corresponds to changing a second angle of transmission and/or reception 29 (see FIGS. 8 and 9).

By using a combination of these two procedures, it is possible to pivot the radar beam 26 essentially freely without having to move the antenna module mechanically. A feed device 18 that must generate an individual radar signal for each of the individual antenna devices 16 to form such a field from many individual antenna devices 16 is extremely complex, since it must comprise a plurality of outputs that respectively provide a radar signal with a very precise phase position.

Figure 5:
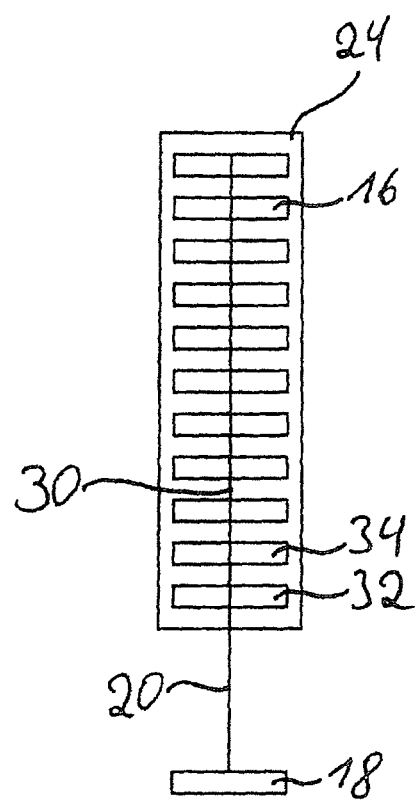
FIG. 5 is a schematic front view of an antenna group.

FIG. 5 shows an antenna group 24 having individual antenna devices 16 and a distribution network 30 connecting the individual antenna devices 16. The feed line 20 of the distribution network is connected to the feed device 18. If the feed device 18 then supplies a radar signal via the feed line 20, this radar signal is distributed by the feed line 20 to the distribution network 30. The radar signal requires a certain propagation time in order to reach the distribution network 30 from the feed device 18 via the feed line. Likewise, the radar signal requires a certain propagation time to travel within the distribution network. The beginning of the radar signal thus reaches the individual antenna device 32 first, because it lies closest to the feed line 20 and therefore also to the feed device 18.

At the instant at which the beginning of the radar signal reaches the second-closest individual antenna device 34, the radar signal already has a different phase position at the first individual antenna device 32 than it had at its beginning. This phase shift from one individual antenna device 16, 32, 34 to the next continues for each of the individual antenna devices 16. It is thus possible to pivot the radar beam 26 through interference in the electromagnetic waves radiated by the individual antenna devices 16, 32, 34.

The magnitude of the phase shift is determined by the propagation time that the radar signal requires to travel from one individual antenna device 16, 32, 34 to the next one. For example, if the propagation time between the individual antenna devices 16, 32, 34 corresponds to an integer multiple of the period of the supplied radar signal, the phase position of the individual antenna devices 16, 32, 34 is identical and the radar beam 26 is radiated perpendicularly.

Figure 6:
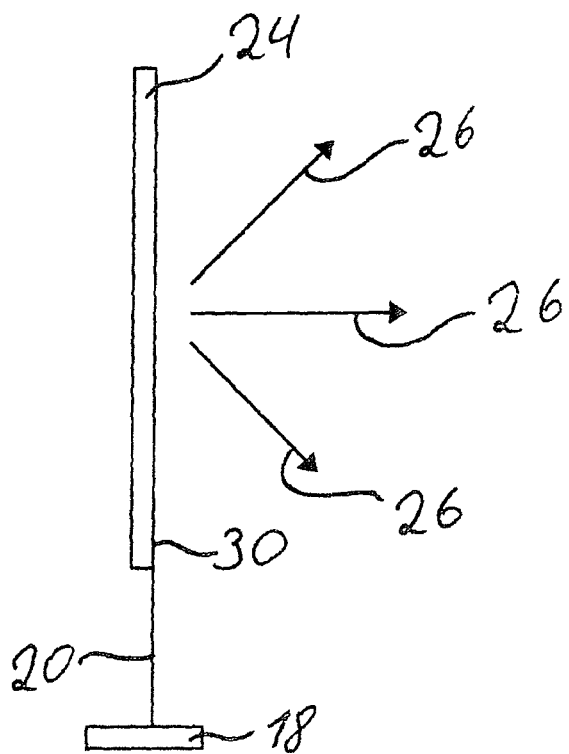
FIG. 6 is a side view of the antenna group.

Changing the frequency of the radar signal causes the period of the supplied radar signal to change simultaneously, so that that the propagation time between the individual antenna devices 16, 32, 34 corresponds to a different phase shift depending on the frequency. The angle at which the radar beam 26 is pivoted depends only on the frequency of the supplied radar signal. The radar beam 26 can thus be pivoted upward as shown in FIG. 6 by changing the frequency of the supplied radar signal. To pivot the radar beam 26 in the first pivot plane 94 in this manner, the feed device 18 merely has to adjust the frequency of the supplied radar signal. This represents a type of analog beam formation. Most current radar systems are capable of adjusting the frequency of the applied radar signal. Additional complex circuits or superstructures are not required.

FIG. 7 shows an arrangement of a plurality of adjacent antenna groups 24. Each of the antenna groups 24 has a feed line 20 with which it is connected to a feed device 18. The feed device 18 supplies the respective antenna groups 24 with phase-shifted radar signals so that the radar beam is pivoted in the second pivot plane 96. In addition, the feed device 18 supplies the respective antenna groups 24 with radar signals of a specific frequency so that the effect described above causes the radar beam to be pivoted in the first pivot plane 94 as a function of the frequency of the radar signal.

The pivoting in the first pivot plane 94 (FIG. 9) is thus determined by the supplied frequency, and the pivoting in the second pivot plane 96 (FIG. 8) is determined by the phase shift of the supplied radar signals. It is thus possible to pivot the radar beam 26 in a completely electronic manner. Devices for mechanically rotating the antenna apparatus 10 or the antenna module 14 are no longer required.

Figure 10:
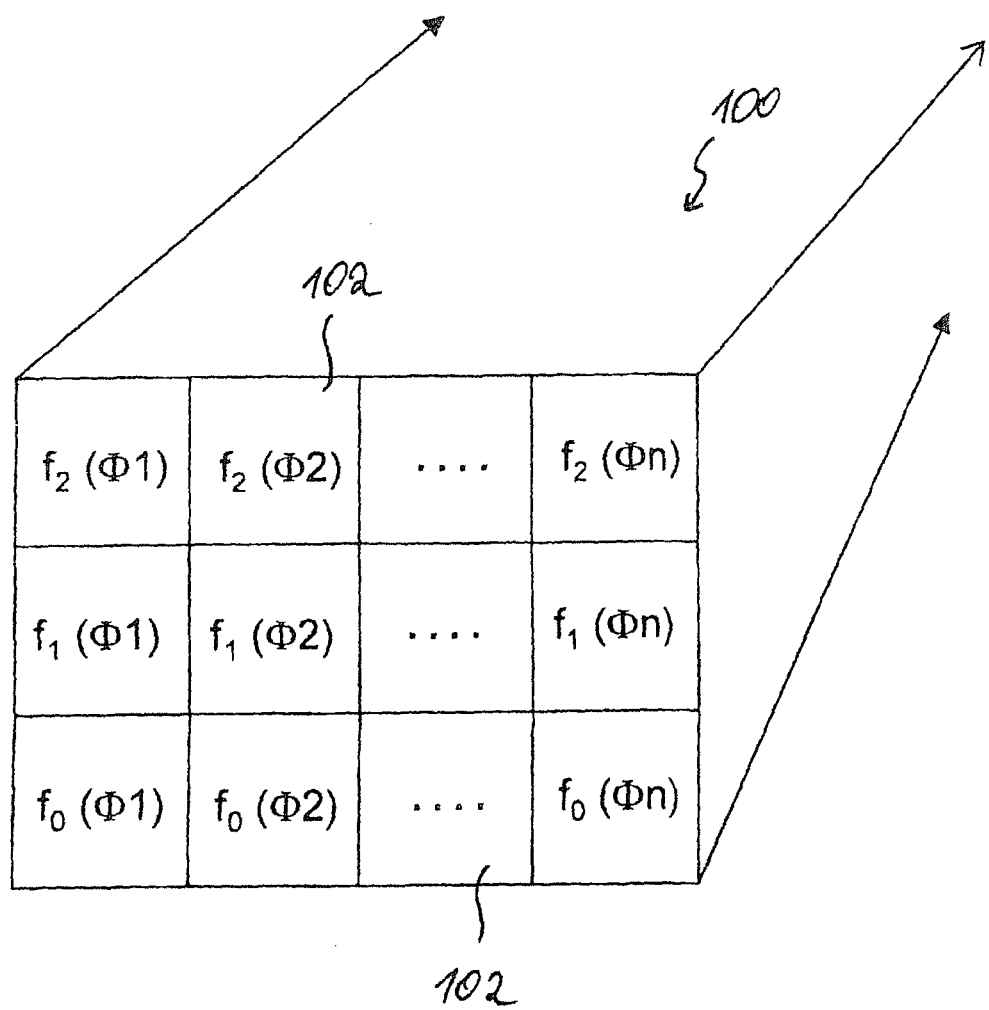
FIG. 10 is a diagram for explaining the image structure of an imaging radar device.

FIG. 10 shows a display device 100 that is part of an obstacle radar. The display device 100 has display elements 102 that are arranged in a rectangular grid. The obstacle radar uses the antenna apparatus 10 to scan an area in front of the antenna apparatus 10 for obstacles using a radar beam 26. To do this, the radar beam 26 is pivoted in a certain angular range in both pivot planes 94, 96, and the information obtained about obstacles is displayed in the display elements 102.

A frequency of the feed device 18 is associated with each row of the display elements 102, and a phase shift between the antenna groups 24 is associated with each column of the display elements 102. In order to obtain a complete image for the display device 100, the feed device 18 generates, for each display element 102, the combination of frequency and phase shift that is associated with that element. Each of the display elements 102 can depict information in a different manner, for example, using coloring, intensity, or brightness.

The obstacle radar can, for example, detect a distance from an obstacle. The closer the obstacle is, the brighter the display element 102. A distance map for obstacles in the visible range of the obstacle radar thus results in a manner that is similar to a camera image in the visible range. It is also conceivable that each of the display elements 102 can represent pictograms or text.

The antenna apparatus 10 is usable in a broadband manner, that is, in a large frequency band, which is 76 GHz to 81 GHz in this embodiment. However, only one narrowband radar signal is generated by the feed device 18.

Aperture illumination is still possible. The radiating elements, that is, the individual antenna devices 16, 32, 34, can thus be varied such that their radiated powers have different magnitudes. Aperture illumination makes possible a beam formation in one spatial direction, which is required for practical applications. A beam formation can also mean that the width of the radar beam 26 (radiation lobe) can be influenced and that the radiation is suppressed in other directions. In order for a beam formation to be possible, the distance of the individual antenna devices 16, 32, 34 cannot be too large. The maximum distance is among other things a function of the frequency of the radar signal used.

In the present embodiment, the individual antenna devices 16, 32, 34 are arranged in a planar fashion and in one plane. An individual antenna device 16, 32, 34 has a substrate having a metalization on the substrate and a completely metalized surface under the substrate. The substrate itself is located between the metal layers.

The use of multilayer substrates may also be expedient. It is thus possible to design an upper layer for the antennas having a low dielectric constant. It is also possible to provide a lower layer having a high dielectric constant that causes a large change in propagation time as a function of the frequency and thus improves the possibility of pivoting.

When transmitting, the digital beam formation can be produced in such a way that the phase shift is generated digitally and then transferred to the antennas via lines having the same length. A reception signal can be transferred via the lines having the same length and then converted from analog to digital. It can then be digitally processed, thus achieving a virtual beam control of the reception lobe.

In the present embodiment, the distances between the individual antenna devices 16, 32, 34 are respectively identical in one dimension 90, 92. However, the distances of the individual antenna devices 16, 32, 34 can be varied without affecting the capability of pivoting the radar beam 26 electronically. The geometry of the arrangement of the individual antenna devices 16, 32, 34 need only be taken into account when selecting the frequencies to be used.

A variety of factors, for example, the dielectrics used when constructing a transmission line, can influence the propagation speed of high-frequency signals in transmission lines. If the propagation speed is reduced via such factors, the transmission line becomes seemingly longer. This apparent length is also referred to as electrical length. As described above, the frequency-controlled analog beam formation can be produced both through different physical line lengths and through different electrical line lengths. If it is possible to change the factors that achieve the different electrical line lengths, it is possible to influence the analog beam formation while the antenna apparatus 10 is being used. It is thus possible, for example, to vary the frequencies used for scanning.

The embodiment depicts the individual antenna devices 16 as having the same size and having the same spatial orientation. However, in some applications, it may be desirable for the individual antenna devices 16 to have different sizes and/or a different spatial orientation. Such variations in the size and/or the spatial orientation make it possible to polarize the radiated radar signal or to achieve an extended antenna bandwidth.

It is also possible to arrange the individual antenna devices 16 along other curves, instead of along straight lines as shown in the embodiment. The individual antenna devices 16 can also be arranged offset relative to each other. The dimensions 90, 92 accordingly do not have to be perpendicular to each other. The above-mentioned modifications make it possible to radiate the radar beam 26 that is radiated by the individual antenna devices 16, 32, 34 at an angle 28 other than 90° if the phase position is identical for all radar signals with which the individual antenna devices 16 are supplied.

The analog beam formation is produced in the embodiment by the feed lines 20 to the individual antenna devices 16 respectively having different lengths. As shown, by connecting the individual antenna devices 16 in series to the feed line 20 or the distribution network 30, the feed device 18 only needs to provide one feed signal for each antenna group 24. The analog beam formation is then performed by the distribution network 30.

It is also conceivable to provide an individual feed signal for each of the individual antenna devices 16 or for any groups of individual antenna devices 16. In this case, the phase shift that is generated in an analog manner can be performed by the feed device 18. For this purpose, for example, it is possible to design the line lengths of the feed lines 20 within the feed device 18 to be physically and/or electrically modifiable. It is further possible to use direct digital synthesis to provide feed signals.

Mechanically pivoted antennas have only limited suitability for integration on flying platforms. Electrical beam pivoting in two dimensions in the higher frequency range is possible only to a limited extent due to geometric and technological limitations and usually entails high overall system costs. The architecture of all existing systems makes them relatively expensive and difficult to integrate onto a flying platform.

As can be appreciated from the above, two-dimensional beam pivoting is achieved according to the invention by the narrowband use of a broadband radar system at different frequencies. In a first spatial direction (for example, horizontal), the beam is controlled in a conventional electronic manner using either analog or digital beam pivoting. In a second spatial direction (for example, vertical), special planar antenna and supply structures cause the antenna beam to be pivoted in different directions when operating the radar system at different frequencies. The described solution thus makes it possible to manufacture a high-resolution 3-D imaging radar sensor that is economical, geometrically almost planar, and which enables electronic beam pivoting in two spatial directions.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An antenna apparatus for a radar sensor, the antenna apparatus comprising:
   a feed device configured to generate a radar signal; and
   a plurality of individual antenna devices configured to interact through interference to generate and/or receive a radar beam at a predetermined angle of transmission and/or reception, the individual antenna devices being provided with Han the radar signal, the individual antenna devices being arranged in a plurality of antenna groups with each of the antenna groups including a respective plurality of the antenna devices arranged sequentially in a direction extending away from a feed input from the feed device such that a phase of the radar signal shifts from one antenna device to the next sequentially along the plurality of antenna devices in the group beginning with the antenna device in the group that is closest to the feed input, a first angle of transmission and/or reception of the radar beam in a first pivot plane that extends along the direction away from the feed input is determined via an analog beam formation, and a second angle of transmission and/or reception of the radar beam in a second pivot plane, different from the first pivot plane, is determined via a digital beam formation.

2. The antenna apparatus claimed in claim 1, wherein the first angle of transmission and/or reception is determined via a frequency of the radar signal.

3. The antenna apparatus as claimed in claim 2, wherein the feed device is connected to the individual antennas via feed lines, and the feed lines to the individual antennas have different electrical lengths.

4. The antenna apparatus as claimed in claim 2, wherein the antenna groups are arranged next to each other.

5. The antenna apparatus as claimed in claim 1, wherein the feed device is connected to the individual antennas via feed lines, and the feed lines to the individual antennas have different electrical lengths.

6. The antenna apparatus as claimed in claim 5, wherein the antenna groups are arranged next to each other.

7. The antenna apparatus as claimed in claim 1, wherein the antenna groups are arranged next to each other.

8. The antenna apparatus as claimed in claim 7, wherein an individual feed line is provided for each antenna group to connect to the feed device, the feed device being configured to provide a separate feed signal for each antenna group.

9. The antenna apparatus as claimed in claim 8, wherein the feed device which is configured to supply the antenna groups is configured such that the phase shift between the radar signals of the individual antenna groups is adjustable.

10. The antenna apparatus as claimed in claim 1, wherein
the feed device is configured to generate feed signals to perform the analog beam formation in the first pivot plane and to perform the digital beam formation in the second pivot plane.

11. A method for operating a radar sensor having an antenna apparatus as claimed in claim 1, the method comprising
using an analog beam formation to pivot the radar beam by a first angle in the first pivot plane.

12. The method as claimed in claim 11, further comprising changing a frequency of the feed signal for the analog beam formation.

13. The method as claimed in claim 12, wherein
the feed signal of the antenna groups respectively have a phase shift relative to the feed signals of the other antenna groups such that the radar beam is pivoted by a second angle in a second pivot plane.

14. An aircraft having an antenna apparatus as claimed in claim 1.

15. A method for generating a radar beam that is electronically pivotable, the method comprising:
generating the radar beam through interference of radar waves that are emitted by a plurality of individual antenna devices that are supplied with a feed signal from a feed device by feed lines, the individual antenna devices being arranged in a plurality of antenna groups with each of the antenna groups including a respective plurality of the antenna devices arranged sequentially in a direction extending away from a feed input from a respective one of the feed lines such that a phase of the radar signal shifts from one antenna device to the next sequentially along the plurality of antenna devices in the group beginning with the antenna device in the group that is closest to the feed input; and
using an analog beam formation to pivot the radar beam in a first pivot plane that extends along the direction away from the feed input.

16. The method as claimed in claim 15, further comprising
changing a frequency of the feed signal for the analog beam formation.

17. The method as claimed in claim 16, wherein
the feed signal of the antenna groups respectively have a phase shift relative to the feed signals of the other antenna groups such that the radar beam is pivoted in a second pivot plane.

18. The method as claimed in claim 15, wherein
the feed signal of the antenna groups respectively have a phase shift relative to the feed signals of the other antenna groups such that the radar beam is pivoted in a second pivot plane different from the first pivot plane.

19. The method as claimed in claim 18, further comprising
using a digital beam formation to supply the antenna groups with the feed signal.

20. The method as claimed in claim 18, further comprising
using a digital beam formation to supply the antenna groups with the feed signal.

* * * * *